United States Patent [19]
Kearsley

[11] 3,986,096
[45] Oct. 12, 1976

[54] CONVERTER CIRCUIT

[75] Inventor: Wayne A. Kearsley, Chelmsford, Mass.

[73] Assignee: Flash Technology Corporation of America, Nashua, N.H.

[22] Filed: May 5, 1975

[21] Appl. No.: 574,641

[52] U.S. Cl. .................................. 321/2; 321/44
[51] Int. Cl.² .................................... H02M 3/335
[58] Field of Search ..................... 321/2; 333/112

[56] References Cited
UNITED STATES PATENTS

| | | | |
|---|---|---|---|
| 3,313,954 | 4/1967 | Walker | 331/112 X |
| 3,421,069 | 1/1969 | Minks | 321/2 |
| 3,575,153 | 4/1971 | Hardin et al. | 321/2 X |
| 3,740,589 | 6/1973 | Minks | 331/112 X |
| 3,812,435 | 5/1974 | Ostapiak et al. | 331/112 |

Primary Examiner—William M. Shoop
Attorney, Agent, or Firm—Thomas N. Tarrant

[57] ABSTRACT

A DC to DC voltage converter using a transformer in which an amplifier driven by a portion of the primary winding opens and closes the primary current path so as to provide self-oscillation and an auxiliary switching circuit cuts the amplifier off at the appropriate point in the cycle faster than achieved by amplifier saturation so as to improve efficiency.

7 Claims, 2 Drawing Figures

CONVERTER CIRCUIT

BACKGROUND OF THE INVENTION

1. Field of the Invention:

The invention relates to DC to DC voltage converters and particularly to those in which an amplifier in the primary circuit is driven by autotransformer action in a portion of a transformer primary winding to produce self-oscillation.

2. Description of the Prior Art:

For a low to high voltage conversion it is common to build up current in a transformer winding to a maximum and then interrupt it suddenly so that the magnetic flux field collapses abruptly across the secondary winding to produce a high voltage pulse in the secondary. One known way of doing this is depicted in FIG. 1 where primary winding 10 of transformer 11 has tap 12 for dividing it into main portion 14 and auxiliary portion 15. Transistor 16 has its emitter-base circuit connected in series with portion 15. The emitter-collector circuit of transistor 16 is connected in a series loop with portion 14 and source 17. Start-up bias is provided by resistor 18 from the base of transistor 16 to the negative side of source 17. When switch 20 in series with source 17 is closed, transistor 16 starts conducting providing current through portion 14 and effectively isolating portion 15 from source 17. Autotransformer action between portions 14 and 15 then increases the drive to the base of transistor 16 producing a rapid turn-on of transistor 16 into saturation. As transistor 16 reaches saturation the current in portion 14 begins to stabilize reducing the autotransformer drive to the base of transistor 16 which then starts to turn off. Again autotransformer reaction due to current drop in portion 14 occurs. This time the drive to the base of transistor 16 is reversed turning transistor 16 off in opposition to the bias from resistor 18. Upon stabilization, the bias from resistor 18 starts the cycle anew so that the circuit is free running. The turn-off of transistor 16 is sufficiently abrupt to dump most of the energy stored in core material 21 into secondary winding 22. To the extent the turn-off is not square, there is a loss of efficiency.

SUMMARY OF THE INVENTION

Now, in accordance with the invention, an auxiliary switching circuit is provided to the converter of FIG. 1 to speed up the turn-off of the current switching amplifier. A capacitor connected between the tap on the transformer primary and a source is also connected to a voltage triggered switch connected in a circuit between the source and the drive to the current switching amplifier. In operation, the capacitor begins to charge as soon as the current switching amplifier starts to turn on and charges for an interval determined by the current source until it reaches the trigger voltage for the switch. Drive from the current source is then transferred to the current switching amplifier driving it immediately into cutoff. Thus, the object of the invention is to provide a DC to DC voltage converter of improved efficiency due to faster switching circuitry.

Further objects and features of the invention will become apparent upon reading the following description together with the drawing.

Figure 1:
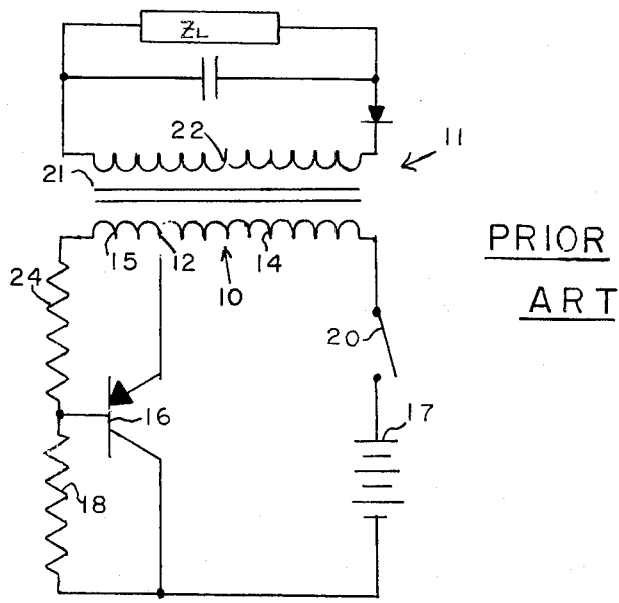
FIG. 1 is a simplified schematic of a prior art converter.
Figure 2:
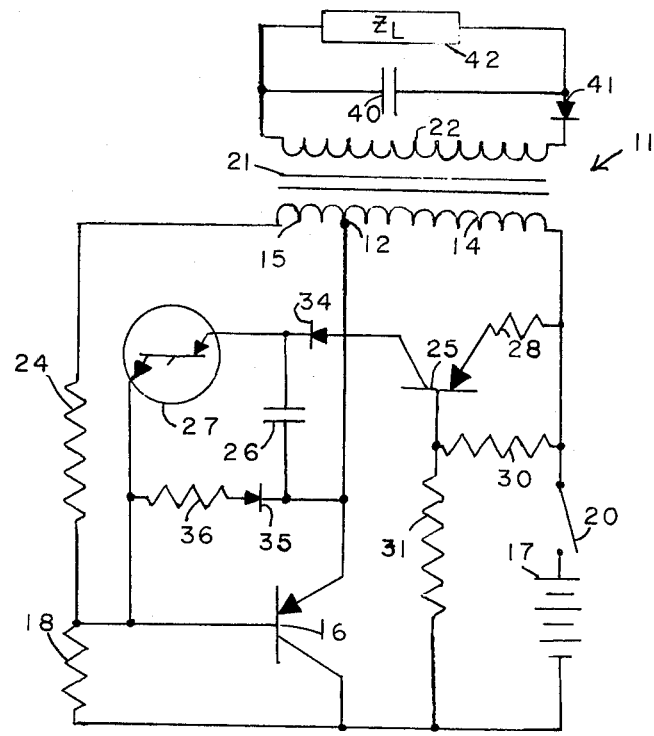
FIG. 2 is a simplified schematic of a converter according to the invention.

DESCRIPTION OF THE PREFERRED EMBODIMENT:

Fast turn-off of transformer current is provided by the circuit shown in the simplified schematic diagram of FIG. 2. For ease of comparison, those components of FIG. 2 that are direct counterparts of components in the prior art circuit of FIG. 1 are numbered the same. Thus in FIG. 2, source 17 is connected to primary winding 14 by means of switch 20 and a current switching amplifier 16 depicted as PNP transistor 16. The base of transistor 16 is connected to the negative side of source 17 by resistor 18 and to the end of trigger 15 by resistor 24. While primary winding 14 and trigger winding 15 are depicted as a single tapped winding, they may be separate windings and it is simpler to discuss them as separate windings for this description.

The main components of the added circuitry according to the invention are a current source using PNP transistor 25, capacitor 26 and a voltage sensitive switching element depicted as switching diode 27. The emitter and base of transistor 25 are connected to switch 20 by means of resistors 28 and 30 respectively. The base of transistor 25 is also connected to the negative side of source 17 by resistor 31. The collector of transistor 25 is connected to the anode of diode 34, the cathode of which is connected both to one end of capacitor 26 and to the anode of switching diode 27. The emitter of transistor 16, which is connected to tap 12 at the junction of primary winding 14 and trigger winding 15, is also connected to the second end of capacitor 26 and to the cathode of diode 35. Resistor 36 connects the anode of diode 35 to the cathode of diode 27 and to the base of transistor 16. The secondary circuit of transformer 11 is not critical to the invention and is shown in a very simple arrangement. Secondary winding 22 has capacitor 40 in series with rectifier 41 connected across it. Load 42 is connected across capacitor 40. Load 42 may, for example, be a flash tube.

The operation of the circuit of FIG. 2 is as follows: Upon closure of switch 20, resistor 18 biases the emitter-base junction of transistor 16 in the forward direction so that a conduction path is provided from source 17 through primary winding 14, transistor 16 and back to source 17. This conduction path effectivey isolates trigger winding 15 from source 17, but induction between windings 14 and 15 provides additional forward bias to transistor 16 through current limiting resistor 24. As a result the current through winding portion 14 rapidly increases until transistor 16 nears saturation. This operation is the same as for the prior art FIG. 1. In the circuit of FIG. 2, conduction of transistor 16 also establishes a path from the negative side of source 17 through capacitor 26, diode 34, the collector/emitter circuit of transistor 25 and resistor 28 to the positive side of source 17. Transistor 25 is biased into conduction by resistor 31. Transistor 25 now acts as a current source charging capacitor 26 at a constant rate determined by the voltage divider network of resistors 30 and 31. The voltage across capacitor 26 is also imposed across diode 27 which eventually triggers into its conductive state. Diode 27 is suitably a pnpn or othr multilayer diode having a fast switching characteristic. Other types of fast voltage sensitive switches may be used. The time that diode 27 swicthes into conduction is determined by the size of capacitor 26 and resistors 28, 30, and 31. The values are desirably selected so that diode 27 triggers prior to saturation of transistor 16. Diode 27 transfers a positive bias to the base of transistor 16 providing abrupt sharp turn-off of transistor 16. Upon abrupt turn-off of transistor 16, current through winding portion 14 halts, the magnetic field collapses, and the energy, largely stored in core 21, is transferred to the secondary circuit through winding 22. At the same time diode 35 and resistor 36 discharge capacitor 26 restoring diode 27 to the "open" state. The cycle then begins again automatically and continues. It will be recognized that once diode 27 triggers and starts turning transistor 16 off, induction between windings 14 and 15 again comes into operation aiding turn-off of transistor 16.

While the invention has been described with relation to a single simplified embodiment, it is applicable to all converter and related circuits having the basic theoretical approach of FIG. 1. Thus it is the intention to protect those aspects of the invention set forth within the full scope of the appended claims.

I claim:

1. In a DC to DC converter having a transformer, a secondary winding on said transformer connected to feed a load, a primary winding on said transformer, means to connect said primary winding in a circuit with a DC power source and a solid state current switching amplifier, driving circuitry for said amplifier, a trigger winding inductively coupled with said primary winding and connected to the driving circuitry of said amplifier so as to turn said amplifier cyclically on and off, the combination in the driving circuitry of said amplifier comprising:
  a. a capacitor;
  b. a solid state current regulator as a current source;
  c. a voltage sensitive switch having first and second terminals;
  d. means to connect one end of said capacitor to said primary winding;
  e. means to connect the other end of said capacitor to said current source;
  f. means to also connect said other end to the first terminal of said switch; and
  g. means to connect the second terminal of said switch to drive said amplifier from said currrent source upon the voltage across said capacitor reaching a level to trigger said switch.

2. In a DC to DC converter according to claim 1, the combination in which said voltage sensitive switch is a semiconductor 3. In a DC to DC converter according to claim 1, the combination wherein said trigger winding is serially continuous with said primary winding and said one end of said capacitor is connected at a tap defining the junction of said trigger winding and said primary winding.

4. In a DC to DC converter according to claim 3, the combination wherein said trigger winding is connected across the control junction of said current switching amplifier in parallel with the series combination comprising said capacitor and said voltage sensitive switch.

5. In a DC to DC converter according to claim 1, the combination wherein said trigger winding is connected across the base-emitter junction of said current switching ampliifier in parallel with the series combination comprising said capacitor and said voltage sensitive switch.

6. In a DC to DC converter according to claim 1, the combination in which said amplifier is a transistor having base, collector and emitter electrodes, and said trigger winding and second terminal of said switch are each connected to the base electrode.

7. A method of increasing the speed of cyclical current interruption in the transformer primary of a DC to DC voltage converter having a current switching amplifier driven by inductive action in said primary for cyclically connecting and interrupting current through said primary comprising:
  a. connecting a voltage sensitive switch between a capacitive voltage source sufficient to turn said amplifier off and a control terminal of said amplifier;
  b. charging said capacitive voltage source at a constant rate during conduction of said amplifier until said switch closes;
  c. discharging said capacitor through said switch to render said amplifier nonconductive, whereby said amplifier is turned off abruptly and both said switch and said amplifier recycle.

* * * * *